Aug. 17, 1954     E. F. CHANDLER     2,686,863
FLUID HEATING AND CIRCULATING DEVICE
Filed Aug. 7, 1951     3 Sheets-Sheet 1
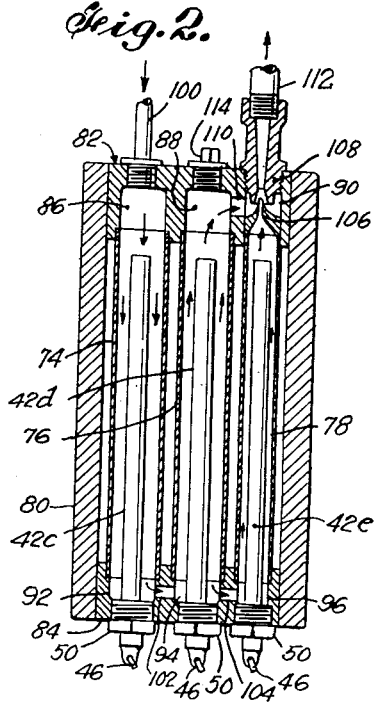
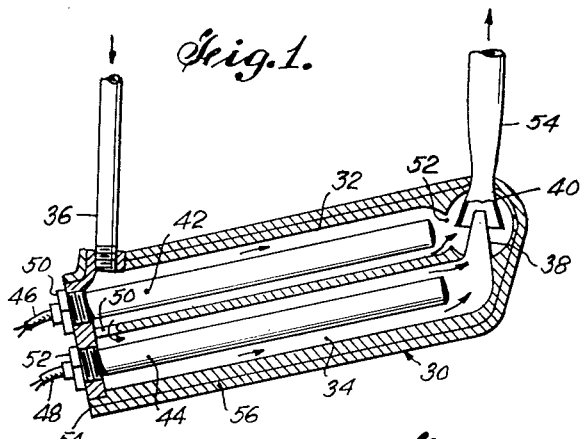
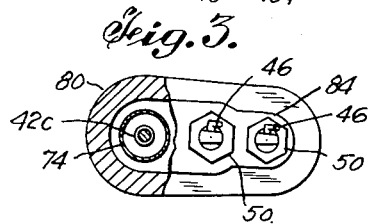
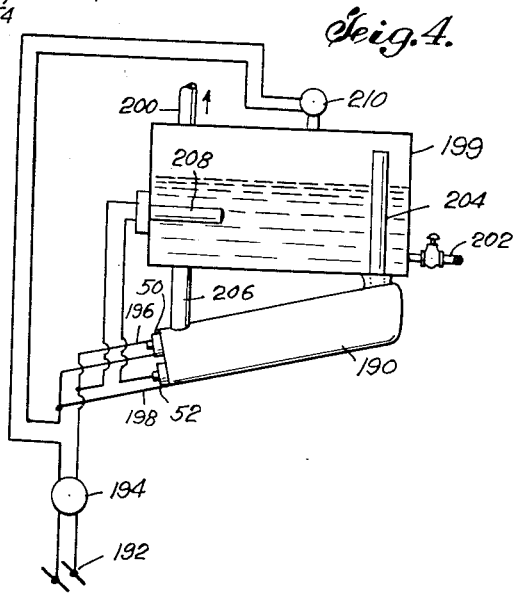
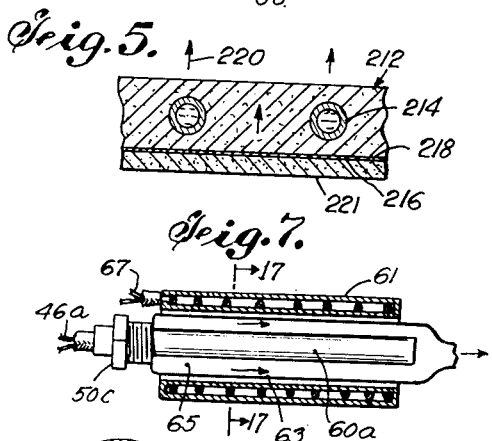
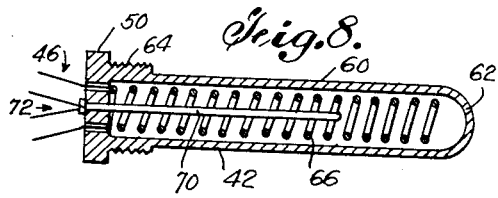
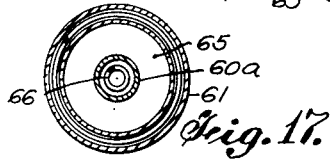
INVENTOR
EDWARD F. CHANDLER
BY Peter Fries, Jr.
ATTORNEY Aug. 17, 1954  E. F. CHANDLER  2,686,863
FLUID HEATING AND CIRCULATING DEVICE
Filed Aug. 7, 1951
3 Sheets-Sheet 2
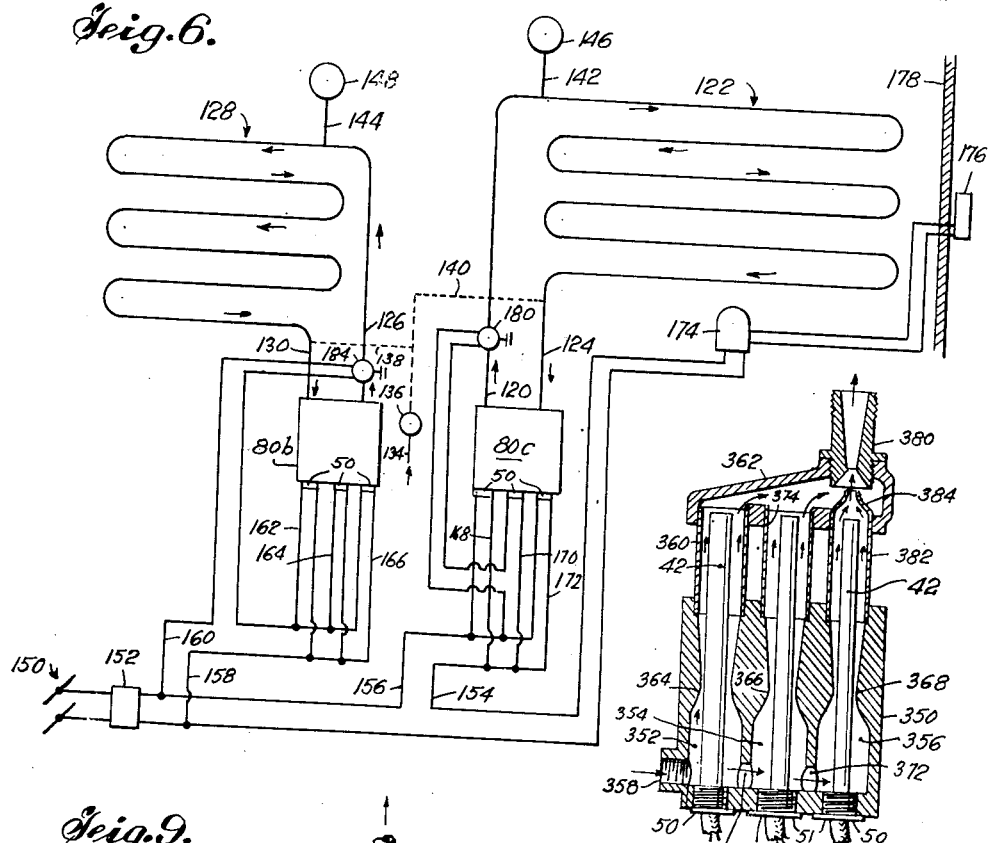
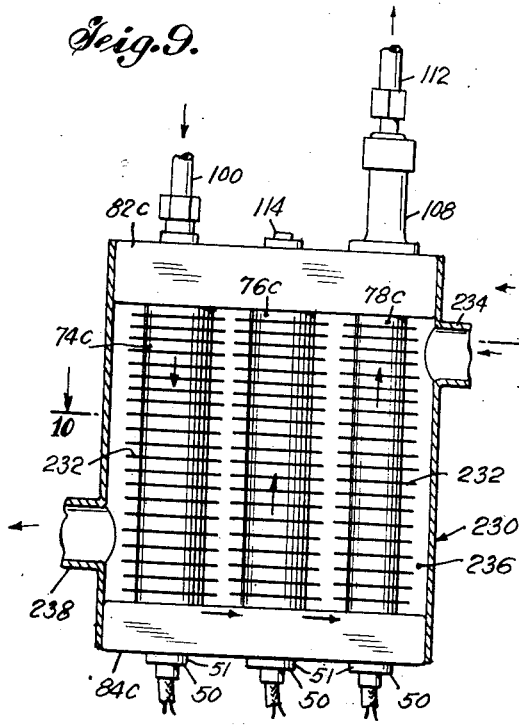
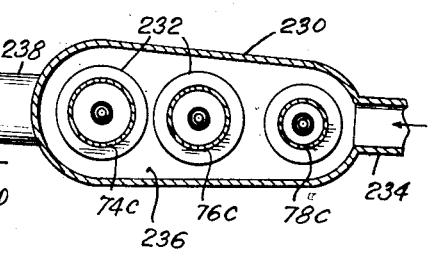
INVENTOR
EDWARD F. CHANDLER
BY Peter Fries, Jr.
ATTORNEY Aug. 17, 1954  E. F. CHANDLER  2,686,863
FLUID HEATING AND CIRCULATING DEVICE
Filed Aug. 7, 1951  3 Sheets-Sheet 3
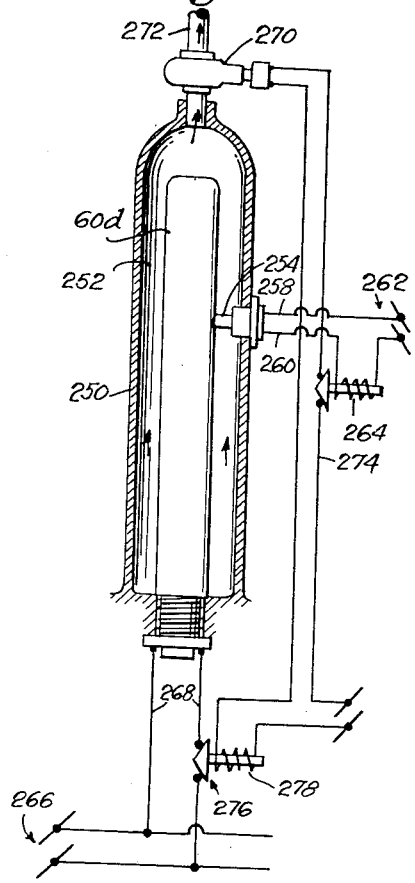
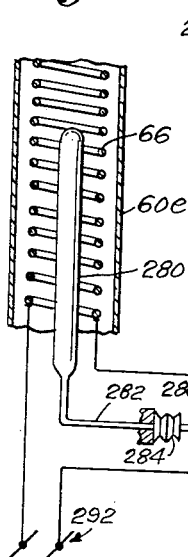
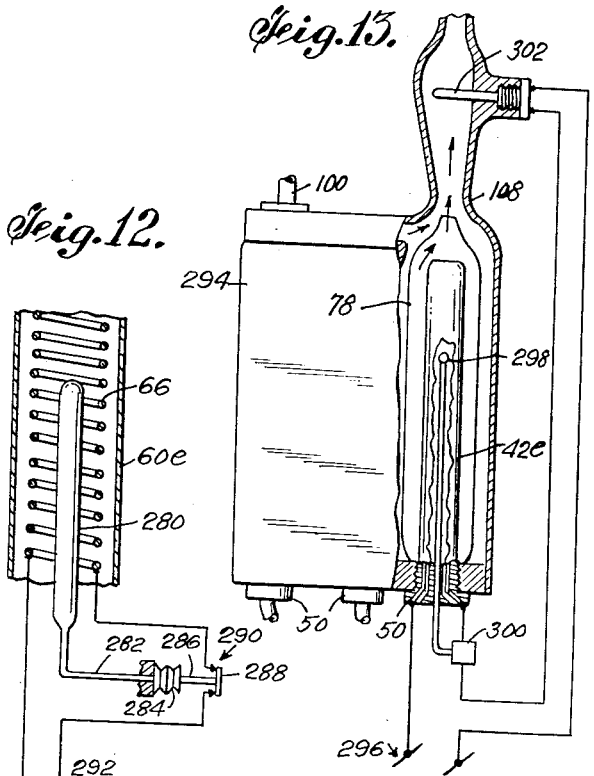
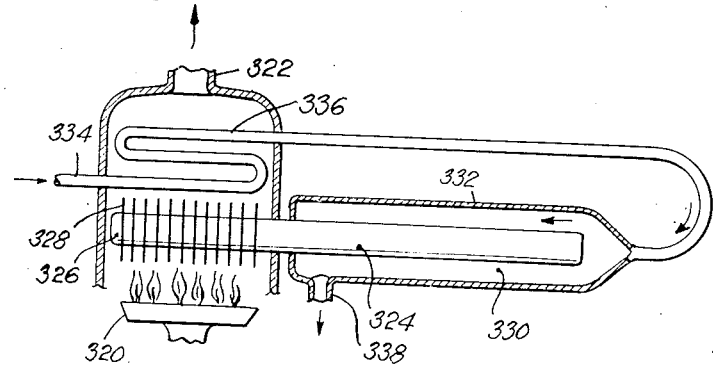
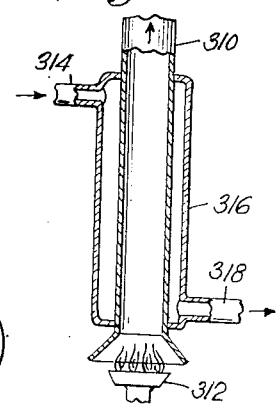
INVENTOR.
EDWARD F. CHANDLER
BY Peter Fries, Jr.
ATTORNEY Patented Aug. 17, 1954

2,686,863

UNITED STATES PATENT OFFICE 2,686,863

FLUID HEATING AND CIRCULATING DEVICE

Edward F. Chandler, Brooklyn, N. Y.

Application August 7, 1951, Serial No. 240,709

19 Claims. (Cl. 219—39)

This invention relates to improvements in fluid heating and circulating devices.

An object of the invention is to provide a new and novel method of and apparatus for circulating and rapidly heating a fluid stream.

Another object of the invention is to provide a novel apparatus and method for thermally circulating a fluid at predetermined flow rates, as it is heated.

A further object of the invention is to provide a novel apparatus and method for circulating a fluid while under the influence of heat applied thereto to raise the temperature thereof, and entirely in the absence of mechanical pumping or impelling means.

Still another object of the invention is to provide thermal fluid circulating means making use, where desired, of immersion type electrical heating devices supplied with electrical energy for heating the same from outside power sources.

Still a further object of the invention is to provide a fluid heating and circulating device in which a tubular film or column of fluid is highly heated, whereby the fluid is expanded and caused to issue from its restricting channel as a fluid jet of relatively high velocity and temperature, and, in case the fluid is water, for example, at or near the steaming point, this jet being directed into the throat of a Venturi tube to create a zone of reduced pressure, whereby preheated fluid or fluid to be heated, from another channel is induced into and mixed with the higher velocity stream to augment and/or modify the temperature and volume of fluid delivered from the apparatus.

Still another object of the invention is to provide a fluid heating and circulating device of the type described, in which arrangement is made of the apparatus so that fluid entering the apparatus is divided into a plurality of individual streams, each of which is heated to a greater or lesser degree, depending upon its function, a main or motor stream being sufficiently heated to convert latent heat into kinetic energy utilized in the form of a velocity jet, the action of which circulates another fluid stream toward and into the jet to mix therewith for delivery from the apparatus as a single stream of heated, rapidly flowing fluid.

Another object of the invention is to provide a novel and improved apparatus which has many applications in economically heating and circulating a body of fluid or stream thereof as for example, for the generation of hot water for domestic and industrial purposes; for the rapid generation of steam for power or process purposes, all at low cost, and without need for the use of costly and complex mechanical pumping means.

A further object of the invention is to provide apparatus of the character described, in which individual electric heater means are employed in transferring heat to each compartmental section of the device, resulting in ease and convenience of selectively controlling the operation of the individual heating elements for governing the end results obtainable from the apparatus.

Still another object of the invention is to provide a device of the character described, which may be employed for the thermal treatment of fluids and liquids, including such processes as selective distillation thereof.

Another object of the invention is to provide a novel fluid heating and circulating device which has particular advantages in connection with residential panel and radiant heating.

A further object of the invention is to provide novel apparatus of the character described, which may be employed in rapidly vaporizing a body or stream of liquid under conditions of high thermal flux density, and while a portion of the liquid is rapidly circulated while being heated, permits the use of relatively small, compact, light weight apparatus for a given load capacity, affording efficient and economical performance using apparatus that is simple in construction and inexpensive to build, also apparatus which may be used as a flash steam generator.

These and other objects and advantages of the invention will become apparent from the following description of a preferred embodiment thereof as illustrated in the accompanying drawings, forming a part hereof, and in which:

Figure 1 is a sectional elevational view of a first form of the invention.

Figure 2 is a sectional elevational view showing a first modified form of the invention.

Figure 3 is a plan view of the device shown in Figure 2, as seen from below, a portion of the view being broken out to further illustrate its construction.

Figure 4 is a partly schematic and diagrammatic view showing how an electric heating unit, of the type illustrated in Figures 1 and 2, may be employed in conjunction with a tank for the storage of hot water and/or in connection with a boiler for the generation of steam.

Figure 5 shows a fragmentary cross sectional view of a portion of a radiant heating panel embodying heating means according to the invention.

Figure 6, shows partly schematically a heating system according to the invention, in which two or more electric heating units like the one shown in Figure 2, for example, may be employed as the heat sources for radiant panel heating.

Figure 7 is a fragmentary sectional view of a portion of the heating units shown in either Figure 1 or 2, illustrating a modification in which heat is applied to the fluid stream both internally and externally.

Figure 8 is a longitudinal sectional elevational view showing the construction of the electrical heating elements themselves which are employed in the devices shown herein, such as in Figures 1 and 2, and including thermostatic means for regulating and controlling the temperature thereof.

Figure 9 is a partly sectioned elevational view showing another modified form of the invention, having provision for also heating air as well as water.

Figure 10 is a transverse sectional plan view taken substantially on plane 10—10 of Figure 9.

Figure 11 is a fragmentary sectional elevation of a heating unit according to the invention as included in a system for controlling and regulating the same, including also protective means for the electric heating elements against high temperatures thereof.

Figure 12 is a fragmentary sectional elevation of a portion of an electrical heating element for use in the devices shown herein, with thermally responsive protective and control element built into the electric heater.

Figure 13 is a fragmentary sectional elevation of a portion of a heating device according to the invention, the view being partly broken out, and showing temperature protective and regulating means for both the electric heaters and the fluid stream, including schematic circuit therefor.

Figure 14 is a fragmentary sectional elevation showing a modified form of heating system employing heat transmission through a solid bar in a novel manner.

Figure 15 is a sectional elevational view of another form of the invention, in which heat is derived from hot flue gases.

Figure 16 is a sectional elevational view showing another modified form of the invention.

Figure 17 is a sectional elevation taken substantially on plane 17—17 of Figure 7.

This invention concerns itself especially with the problems encountered in methods of and apparatus for circulating and rapidly heating a fluid stream, by use of thermal means for inducing and maintaining fluid flow and circulation. The application is a continuation of my copending patent applications, Serial Numbers 181,211; 176,180; 104,551; 749,054; and other pending patent applications of mine.

The invention in one aspect embodies electric heating means, and, while external electric heating means may be employed, internal or "immersion" type heating elements alone, or in conjunction with external heating means, may also be employed. In certain preferred embodiments of the inventive idea, immersion type heating elements are used for simplicity of overall construction, replacement convenience, low cost, and other reasons, immersion type heating elements including for example those which have resistance wires such as Nichrome, and the like, wound around a form, and placed inside a casing, with lead wires from the resistance wires being connectable through grommets with the power source, such as the electric power lines, for energizing the resistance wires to heat them, and thus heat the casings and any fluid coming into contact therewith or in which the casings are immersed.

The desired results, according to one aspect of the invention, are obtained by preferably highly heating a tubular film or column of fluid whereby the fluid is expanded and caused to issue from its restricting channel as a fluid jet of relatively high velocity and temperature, being, in the case of water, at or near the steaming point. This jet is directed into the throat of a Venturi tube to create a zone of reduced pressure whereby preheated fluid or fluid to be heated, from another channel is induced into and mixed with the higher velocity stream to augment and/or modify the temperature and volume of fluid delivered from the apparatus. In the operation of the device or system, fluid entering the apparatus is divided into a plurality of individual streams each of which is heated to a greater or lesser degree depending upon its function. A main, or motor stream, is handled as already described, being sufficiently heated to convert latent heat into kinetic energy utilized in the form of a velocity jet, the action of which circulates another fluid stream toward and into the jet to mix therewith for delivery from the apparatus as a single stream of heated, rapidly flowing fluid.

A system of the order herein disclosed has many applications where it is desired to heat and circulate economically and efficiently, a body of fluid, as for example, in the generation of hot water for domestic or industrial uses; for the rapid generation of steam for power or process purposes, and for the thermal treatment of fluids and liquids, selective distillation being one example only. An important advantage of the system and the employment therein of individual electric heater means resides in the ease and convenience of selectively controlling the operation of the individual heating elements for governing the end results obtainable from the apparatus. By use of thermally responsive control means affected by the temperature of the fluid or the heat source at given points in the system, a desired fluid end or outlet temperature may be obtained and automatically maintained and/or by means responsive to pressures within the system or to ambient temperatures, accurate operating conditions may be established according to any desired pattern.

Another important application of the invention, disclosing many advantages, is its use when employed as the source of heat for the generation and circulation of hot water as in residential panel or radiant space heating. In this type of heating, a continuous length of relatively small diameter tubing, in the form of a flat coil, is embedded in the floor, walls or ceiling of a room or several rooms, depending upon the design of the dwelling. A hot water, oil or gas-fired boiler, heats a body of water which, by means of a motor operated circulator, in conventional systems, is pumped through the coil or coils in each room or rooms. The radiant heat emitted by the heated coils serves to prevent the occupant from losing body heat too rapidly, and although the temperature of the water in the system is comparatively low, of the order of from 90 degrees to 120 degrees Fahrenheit, sufficient physical comfort is afforded.

It is customary in such conventional systems to use a single boiler unit and to pump the heated water from the boiler through the tubing comprising the radiant panels in the entire house, by means of mechanical pumps. The subject of the present invention, affords a new and simplified approach to such panel or radiant heating, by an apparatus which provides important economies in installation cost, operating efficiency, plus the advantages and convenience of heating by electricity. In accordance with this invention, the heating unit, for a given heat load, is small, compact, fully automatic and inexpensive to construct.

Accordingly, instead of installing a single heating boiler capable of handling the entire load together with pumps, motors, and other auxiliary equipment, it is desirable to install two or more of the small electric units herein disclosed, each being capable of handling a given portion of the total load. This eliminates the space otherwise required for a gas or oil fired boiler and eliminates the need for mechanical pumping means for circulating the water. Furthermore, as fully brought out hereinafter, further important gains and advantages are made available over conventional radiant heating systems.

As one example, true "zone" heating is provided, with its acknowledged savings in operating expense, it being possible to control the operation of the independent heating units in direct response to load requirements in each section of the dwelling or other building, the cooler sections receiving the heat needed, and the warmer sections, according to the external atmospheric conditions, position of the sun, etc., requiring less, and at times, no heating whatsoever. Another advantage of the system and apparatus herein disclosed resides in the fact that the rate of circulation of the fluid through the panels increases with the demand for heat and decreases as the demand is satisfied, assuring a definite economy of electrical energy. The operation of the heating unit is very flexible and it, and/or its individual heating elements may be accurately controlled for a maximum of comfort by condition-responsive governing means situated externally of the dwelling quarters. Such latter means, for example, may be adjusted to condition the interior control means in response to weather changes, thus anticipating and preparing the interior control system for quick response to ambient temperature changes. Reference to the use of the invention in connection with panel heating is by way of example only, and is not intended in any way to indicate any limitation as to the uses of the same, being only a typical example of one possible specific type of application.

Among other typical uses of the invention is its application to steam generation. In this connection, the ability to rapidly vaporize a body of liquid under conditions of high thermal flux density and while a portion of the liquid being heated, is rapidly circulated, permits the use of a relatively small, compact, light weight apparatus for a given load capacity. It also affords efficient and economical performance using apparatus that is simple in construction and inexpensive to build. The apparatus may be used as a flash generator, for the continuous delivery of steam for industrial or other purposes or as the means for rapidly generating steam in a boiler or storage tank for process, power or other uses. In each instance, the advantages of simplicity, absence of mechanical moving parts, pumps and such apparatus, and the use of electrical heating and further, the accessibility of parts which may require replacement, will be apparent to those versed in this art.

In order to understand clearly the nature of the invention, and the best means for carrying it out, reference may now be had to the drawings, in which like numerals denote similar parts throughout the several views.

Referring now to Figure 1, it is seen that there is shown a heating unit embodying the inventive idea, in which there is a main body portion or housing 30 having elongated tubular passageways 32 and 34 formed therein. At 36 is shown a fluid inlet duct which communicates with and introduces fluid into the left end of tubular element 32. The housing 30 is also provided with a nozzle 38 forming the right end discharge outlet of tubular passage 34, the nozzle 38 being directed into the throat of the Venturi tube 40 which serves as the fluid outlet as shown. Removably secured in the left end of the main body portion 30 are the electric heater elements 42 and 44 which extend into and through the passageways 32 and 34 respectively, the heater elements being adapted to be electrically energized by current supplied from a current source by wires 46 and 48 extending through insulating bushings which extend through the threaded terminals 50 and 52, the latter being threaded removably into openings formed in the left end wall 54 of the main housing 30.

Fluid entering at 36 fills tube 32 and tube 34, and when the heaters 42 and 44 are in operation, fluid in tube 32 is preheated and the fluid in tube 34 is highly heated, the heating powers of the respective heating elements 42 and 44 being arranged for this purpose so that more heat is provided by heater 44. The highly heated fluid in tube 34 thus expands to develop pressure which is converted into a velocity stream by the nozzle 38, which action sets up an ejector action causing preheated fluid from tube 32 to flow into tube 34 through the port 56, while some of the fluid passes through port 52 and is inducted into the nozzle stream, mixed therewith, leaving the heating unit through the outlet 54. The fluid from tube 32, inducted by Venturi action into the velocity fluid stream from nozzle 38, depending upon its volume and temperature, may serve to modify the end temperature of the fluid leaving the heater unit.

For example, by suitably regulating the flow and temperature of the fluid being induced through the port 52 and admixed with the nozzle stream, it is possible to control the temperature of the fluid leaving the outlet 54. The unit preferably is encased in a suitable heat insulating jacket 56. A feature of this apparatus is the relatively great heating surface to which a comparatively small volume of fluid is exposed, the rapid movement of the fluid over said surface, and the fact that the heating effect is progressively accumulative, the fluid passing over a series of relatively low temperature heating elements. By employing a series of heating elements of moderate wattage, the effective life of the elements is conserved. Figure 8 shows such a heating element in cross section, and it is seen that it comprises an elongated tube 60, closed at one end 62 and integrated at its other end into the closing bushing 58, which is threaded as at 64 for engagement with the opening in the housing shown at 30, or any of the other housings shown in this application, where a heat-unit such as is shown in Figure 8 may be employed. The electric wires 46 connect the resistance wire coils 66 inside tube 60, with the outside power lines, the heating coils 66 being so supported upon insulating brackets or other well known means as to be electrically insulated from the metallic housing 42. For inherent protection of the heating device, a thermostatic circuit opening switch element 70 may be disposed so as to extend inside the device, as seen in Figure 8, being thus responsive to the temperature of the heating wires 66, so as to open the circuit through some external means by wires 72, feeding current to heating coils 66, in the event of overheating of the heating coils, for any reason.

Figures 2 and 3 represent a modification of the device shown in Figure 1, there being a plurality of substanially vertical cylindrical tubes 74, 76 and 78, for example, enclosed in an insulating jacket 80, to form a unit. The device has top and bottom walls 82 and 84, to which the upper and lower ends of the tubes 74, 76 and 78 are secured, in any suitable manner, in registry at their upper ends with the vestibule recesses or passageways 86, 88 and 90 respectively, in the upper wall 82, and in registry with matching bores 92, 94 and 96 formed in the lower wall 84. In the illustration, it is seen that the bores 86, 88, 90, 92, 94 and 96 are enlarged at their inner ends to provide seats for engagement with the ends of the tubes 74, 76 and 78 respectively, the dimensioning being such, however, as to provied a fluid tight seal at all the joints, or otherwise the joints may be sealed by other well known means, such as brazing, soldering, welding or otherwise.

As seen in Figures 2 and 3, there are heating units 42c, 42d, and 42e, which are similar in construction to the electric heating unit shown in Figure 8, and are removably threadedly engaged by their threaded bases 56 in openings as shown in Figures 2 and 3, forming extensions of the bores 92, 94 and 96. The electric heating tubes 42c, 42d and 42e extend into the water passageways, or other fluid passageways 74, 76 and 78 respectively, as shown, being axially located and spaced from the walls of the tubes such as 74, to allow fluid to flow therebetween, there being thus a somewhat restricted fluid passageway about each electric heating element. Fluid entering inlet 100 flows downwardly about heater element 42c, is heated thereby and passes through port 102, and flows upward in tube 76 where it is heated by element 42d. Some of this preheated fluid passes through port 104 and flows upwardly in tube 78 where it is highly heated by element 42e, expanded and forced out of the nozzle 106 at a velocity jet, this jet being directed into the throat of the Venturi tube 108 which is threaded into the upper end of the bore 90. By this means, an ejector action is established whereby preheated fluid from tube 74, is induced through the port 110 into the nozzle stream with which it mixes and is delivered from the unit through output pipe 112.

Three tubes 74, 76 and 78 are shown in three heating steps, each tube having its individual electrical heating element such as 42c, 42d, and 42e, but it is obvious that the number of tubes which may be employed is optional, depending upon the pattern of results desired. A removable plug 114 is threaded into the opening at the top of bore 88, for closing the same, and affords access to the interior thereof.

Referring now to Figure 6, it is seen that it illustrates schematically how two or more electric heating units, such as 80b and 80c, which are similar to the device shown in Figure 2, for example, may be employed as the heat sources for radiant panel heating. The electrically heated hot water generating and circulating units 80b and 80c, are connected by piping as shown, the heated water leaving unit 80c through pipe 120, corresponding to pipe 112 of Figure 2, and passing through the radiant heating coil 122, the cooler water returning to unit 80c through the pipe 124 which corresponds to pipe 100 in Figure 2. Similarly, the heated water from unit 80b being delivered through pipe 126, corresponding to pipe 112 of Figure 2, passing through the radiant heating coil 128, and returning to unit 80b through pipe 130 which corresponds to pipe 100 of Figure 2.

In the device of Figure 6, it is obvious that either of the coils 122 or 128 may serve as floor, ceiling or wall coils in suitable radiant heating panels as are employed in well known manner in this type of heating system, in which event each coil would be suitably positioned to project the heat rays in the desired direction. At 134 is a pipe connected to a source of water under pressure, suitably controlled by the valve or other means 136, for delivery through the branch pipes 138 and 140 to the coils 122 and 128, whereby said coils are maintained in filled condition. To eliminate air from the radiant panel coils and to insure the coils being properly filled with water, valve air-vents 142 and 144 may be positioned at suitable high points on the coils and above these vents may be disposed suitable expansion tanks 146 and 148, or other suitable means may be employed in any well known manner.

As shown in Figure 6, electrical energy for the heating units 80b and 80c is preferably supplied from the common source 150, controlled by a main switch 152, current being conveyed to unit 80c by wires 154 and 156, and to unit 80b by wires 158 and 160. The individual electric heater elements the bases of which are shown at 50, shown in detail in Figure 8, are supplied by wires 162, 164 and 166 for unit 80b, and by wires 168, 170 and 172 for unit 80c, so that, if desired, when the main switch 152 is closed, both units 80b and 80c would be electrically energized to produce heat and circulation. However, for the purpose of indicating the various possibilities for selectively controlling the operation of such a system, the primary operation of unit 80c is indicated as governed by a means such as a room thermostat 174, which, for example, may be adapted to energize the unit 80c, when a predetermined heating effect is called for, as for example, by an individual room or space.

The actuation of the means 174, may be further controlled by means such as the weather condition responsive means 176 situated outside the dwelling wall 178, said means for example serving to anticipate external temperature changes and to prepare the means 174 for a quicker modification meeting internal required heating conditions. Further, by way of illustration, means 180 such as an aquastat in pipe 120, adjustable to respond to the temperature of the water being delivered by unit 80c, may as shown control the functioning of an individual heater element, for example that one supplied by wires 170, so as to govern the overall heating effect in a desired manner. And, as shown schematically in conjunction with unit 80b, the actuation of the main generator section or, as indicated, the operation of the entire unit may be controlled by the means 184, which may be an adjustable aquastat positioned in the riser pipe 126, and responsive to temperature changes in the heated water being supplied to the coil 128, as for example to start and stop or otherwise modify the operation of the unit 80b.

Because of the design according to the invention the heating units, for a given heat load, are relatively small, compact, simple and inexpensive, and hence they are especially adaptable for use as individual heaters for each radiant heating panel with a consequent elimination of the need for the usual bulky heating unit and the space occupied by the same. Also, individually heating the radiant panels is favorable to "zone" heating methods wherein the radiant panels in certain sections of a dwelling, for example on the southerly side on a bright day, may be relatively inert while the panel, or panels, in another section are active, thereby affording economies not possible with some conventional systems employing a centralized source of heat.

Referring now to Figure 4, there is shown schematically how an electric heating unit, of the type illustrated in Figures 1 and 2, may be employed in conjunction with a tank for the storage of hot water or in connection with a boiler for the generation of steam. In this figure, 190 represents the electrically energized heater unit, similar for example, to the one shown in Figure 1, which is adapted to receive energy from a power source 192 controlled by a main switch 194, through wires 196 and 198 connected as shown, with the electric heater elements shown at 50 and 52, of the unit. A suitable tank or boiler 199 having an outlet 200 for hot water or steam, is provided with an inlet 202 for return or makeup water, depending upon the service for which it is employed. Water heated by unit 190 enters the tank 199 in any suitable manner, as by pipe 204, water from the tank or boiler returning to the heater through pipe 206 to afford circulation and recirculation. As indicated, the operation of the heating unit 190 may be controlled by an aquastat 208, which as shown may govern the action of a heater element, for example, as might be suitable in operating a hot water storage system wherein the water is maintained at a predetermined temperature, or, as might be desirable in a steam generator system, a pressure responsive means 210 may be employed to control the operation of the unit 190 in a manner to maintain a desired head of steam. It will be understood that various changes and modifications may be resorted to in establishing operating control for a specific end result, the means shown being for illustration only of some methods, and not for purposes of limitation. It will be further understood that heater units of the type disclosed may be used without a tank or boiler 199 for the continuous delivery of heated fluid or for the flash generation of steam, or, for the continuous generation or evolution of steam, etc.

Figure 5 shows a cross sectional fragmentary view of a portion of a radiant heating panel, 212, in which the hot water circulating tubes 214 are embedded in a suitable plaster or cement binder adapted to pass radiant heat waves, and in which a suitable ray reflecting surfaced material 216 is positioned in back of said tubes. The reflecting medium 216 may be of metallic foil having its bright face 218 either a plane or suitably formed surface to increase the reflecting action to direct the heat in the directions of the arrows 220. If desired, this reflecting sheet 218 may be backed by plaster board 221 to afford suitable support and/or to aid in forming a self-contained composite unit panel.

Figures 7 and 17 show a modified form of heating device in which the fluid stream is heated from the inside and from the outside. Thus, the heating element 50c has an axial central electrically heated tube 60a and is similar to the one shown in Figure 8. An annular heating element 61 is coaxial with the central tube 60a and spaced therefrom as shown, to provide a fluid passageway therebetween in the direction of the arrows 63, as at 65. Wires 67, like those at 66a are connected to the power lines to heat both units 60a and 61, the fluid stream being heated being thus in the form of a hollow cylinder.

Figures 9 and 10 show a modified form of the invention shown in Figure 2, especially adapted to afford air changes and circulation in a space being heated, and for other uses. As shown, there is an outer casing 230, enclosing upper and lower walls 82c and 84c respectively, which correspond to the walls 82 and 84 of Figure 2. Hollow cylindrical tubes 74c, 76c and 78c, which correspond to tubes 74, 76 and 78 of Figure 2, are seated at their upper and lower ends in the bores formed through the top and bottom walls 82c and 84c, similar to those shown in Figure 2. In the same manner as for Figure 2, the device of Figure 9 also has electric heating elements 50 the bases 51 of which are shown in the view, and their heating tubes 60 as seen in Figures 2 and 8 extend upwards through the tubes 74c, 76c and 78c, being spaced from the walls thereof to provide an annular fluid passageway therebetween as in Figure 2, for flow as in the directions of the arrows shown. The tubes 74c, 76c and 78c are provided with metallic annular fins 232 projecting outwardly into the hollow unfilled spaces surrounding each tube, so that when relatively cool air enters through air inlet 234 and flows through the space 236 inside housing 230, it is heated as it passes over and around the finned tubes, so that as it leaves through outlet 238 it may be circulated through the space being heated. Hence substantially the same quantity of heat is made available, partly as radiated heat feeding radiant heating panels through pipe 112, and by warm air leaving duct 238, both serving to heat the space or room as desired. When it is desired to utilize less of the heat from a particular tube, for example the generator tube 78c, the fins may be omitted from that tube. This may be desirable under some circumstances, so as not to reduce the thermal pumping effect induced by the generator tube 78c, and to maintain a relatively high thermal input ratio to the air heating effect. The relative division of the heat carrying fluid, as between air and water is thus a matter of choice to meet particular conditions and has hence considerable flexibility.

Figure 11 shows a modified form of the invention showing means for controlling the temperatures of the various portions of the device, such as the water temperature, and the temperature of the electric heating elements, to protect against overheating and/or self destruction of the parts. The view is only in fragment, it being understood that the modification has relation to and may be embodied in all the forms already shown herein. Thus there is a hollow tubular housing 250 providing a fluid passageway 252 for the fluid being heated, by means of the electric heating unit 60d which is of the same general type shown in Figures 1 and 2, and in detail in Figure 8, except that the element 70 shown in Figure 8 may be omitted. Instead, a thermostatic switch 254 extends into the fluid stream and into contact with the electric heater casing 60d, this being a switch which is normally closed, and is connected by wires 258 and 260 to the power lines at 262 through solenoid coil 264.

Electric current from lines 266 is supplied to the electric heater 60d through wires 268. An aquastat 270 is interposed in fluid outlet pipe 272, and is set for a predetermined fluid delivery temperature. The thermostatic switch 254, being normally closed, is set to open when a predetermined high temperature is reached by the electric heating element 60d, such excessively high temperature being one which might result, for example from absence of surrounding water in passage 252 to carry off the heat, and under such circumstances the solenoid 264 will open the switch in wire 274, which in turn will open the switch at 276 due to failure of current in solenoid 278, and open the circuit conducting current to wires 268 and the electric heater 60d.

Figure 12 shows a modified form of protective device for one of the electric heaters 60e, which is in general similar to that shown in Figure 8, except that instead of employing the thermal switch 70 of Figure 8, I employ a tube 280 which is closed at one end and open at the bottom for communication by duct 282 with an expansion bellows 284. The bulb 280 contains a gas which is expansible as its temperature rises, or a liquid having similar properties, and extends inside the electric resistance wires 66. When the temperature is excessive inside casing 60e, the bellows plunger 286 moves rightwardly, carrying its switch blade 288 out of conductive contact with the stationary contacts of the switch 290, and opening the circuit to power lines 292.

Figure 13 shows another modification of the invention, which employs a heater housing like that shown in Figure 2, for example, as at 294. The right hand generator tube 78, is similar to that of Figure 2, in having the electric heater 42e extending therethrough, the latter being connected by wires to the power lines at 296. Thermal responsive means 298 is disposed inside the heating element 42e for opening the circuit by actuating the switch 300 when the temperature of the electric heater 42e tends to become excessive. In addition a thermally responsive switch means is provided at 302 in the path of fluid flow in Venturi tube 108, and is so arranged as to open the circuit when there is excessively high fluid temperature, thus shutting off the electric heater 42e. The thermal responsive element 298 may be built into the electric heater or may be positioned adjacent thereto as desired. The life of an electric heater is prolonged if not permitted to become overheated, and further, the heater is protected in the accidental absence of liquid in the device.

Although immersion heating means have been described and illustrated in detail herein as one example of providing for heating of the fluid streams, other means may also be employed for such purposes. For example, the device shown in Figure 1 may be constructed as shown in Figure 15, for example, in which case the hot gaseous combustion products passing up the flue 310 from the fire 312 are the source of heat, the unit being either gas or oil or otherwise fired. Fluid to be heated enters through pipe 314 and flows through the water jacket 316, leaving by outlet pipe 318.

Figure 14 shows another mode of providing the heat to the fluid, there being a source of heat 320 providing hot gaseous products flowing upwards through the stack 322. A massive solid metal bar 324 formed of metallic substance of good heat conductive qualities, such as copper, etc., has one end extending into the path of the hot gases, as at 326, and may have heat absorbing fins 328 to add to the absorbed heat. The heat is conducted rightwardly through the bar 324 into the fluid passageway 330 in housing 332 to heat the fluid therein to any desired temperature. The cool water enters at 334 and flows through the preheater coils 336, being preheated before reaching the housing 332, and then, after being highly heated by bar 324, it leaves the housing by outlet 338 for use in any manner desired. It is noted that the "metal-to-liquid" portion at the right end of the bar 324, that is the part inside housing 332 may also be provided with fins if desired for enhancing fluid heating.

Figure 16 shows a vertical sectional elevation of another modified form of the invention, having some degree of similarity to the form shown in Figure 2, but differing in major respects therefrom. As shown, there is a lower body 350 provided with lower bores through which the bases 51 of the electric heating elements 50 are inserted, so that their casings 42 extend upwardly therefrom, electric resistance heating wires being disposed inside the casings 42 as shown in Figure 8. The fluid entering the device through inlet 358 flows into bore 352 and upwards around the heating element extending therethrough and through the tube 360 into the header casing 362, being heated by element 42. A constriction is formed at 364 in bore 352, and also at 366 in adjacent bore 354, and at 368 in generator bore 356. Fluid also flows through bore 370 into bore 354, and through bore 372 into generator bore 356, the heated fluid flowing upwardly in the direction of the arrows as shown, as it is heated in each bore by the elements 42. The heated fluid from bores 352 and 354 flows upwards through pipes 360 and 374 into the header 362 in the direction of the arrows, and toward the throat of the Venturi tube 380 forming the fluid outlet. It is seen that the generator bore 356 is smaller in inside diameter, and the highly heated fluid being less in quantity therein, will heat and accelerate faster than the others, and is adapted to produce a jet after upflowing through pipe 382 and into jet nozzle 384 which is directed into the throat of the Venturi tube 380, mixing with the fluid from the other tubes 360 and 374, and forcing them into the Venturi tube throat, so as to propel them thereby and to form a pressure stream, the velocity being converted into pressure beyond the throat. Heat energy is thus converted into kinetic energy for accelerating the fluid stream.

Although I have described my invention in specific terms, it will be understood that variations may be made in size, shape, materials and arrangement without departing from the spirit and scope of the invention as claimed.

I claim:

1. Apparatus comprising a housing, fluid inlet means for conducting fluid into said housing, fluid outlet means for conducting fluid from said housing, means in said housing for dividing the flow of said fluid into a first stream and at least a second stream while passing through said housing, first means in said housing for heating said first stream to a high degree, means for heating said second stream to a lesser degree than the heating of said first stream, Venturi tube means having a throat and interposed in said fluid outlet, nozzle means directed into said Venturi tube throat but spaced therefrom, said nozzle means forming a jet outlet for the highly heated first stream of fluid, and the space between said nozzle means and said Venturi tube throat means forming an outlet for said second stream of fluid, whereby, under energy derived from the engagement of said fluid jet from said nozzle means with said Venturi tube throat means, the fluid in said second stream is impelled into said Venturi tube and accelerated into motion therethrough.

2. Apparatus according to claim 1, wherein said first and second means for heating said first and second streams of fluid comprise electrically energized immersion heaters immersed in said first and second streams.

3. Appparatus according to claim 1, wherein said first and second means for heating said first and second streams of fluid comprise electrically energized tubular immersion heaters immersed in said first and second streams and spaced from the walls of said streams to define fluid passageways in which said fluid streams are heated thereby.

4. Apparatus according to claim 1, wherein said first and second means for heating said first and second streams of fluid comprise electrically energized cylindrical immersion heaters immersed in said first and second streams and spaced from the walls of said streams to define fluid passageways in which said fluid streams are heated thereby, the spacing between said first immersion heater and the wall of said first stream being less than the spacing between said second immersion heater and the wall of said second stream, whereby the radial thickness of said first fluid stream is less materially than the radial thickness of said second fluid stream.

5. Apparatus according to claim 1, wherein said first and second means for heating said first and second streams of fluid comprise electrically energized immersion heating elements disposed in the path of flow of said first and second fluid streams for heating the same, and wherein said first immersion heating element heating said first stream is constructed and arranged to dissipate a substantially greater amount of electrical energy in a given time than said heating element heating said second stream, whereby said first stream is more highly heated than said second stream.

6. Apparatus according to claim 1, wherein there is a lateral duct communicating between the inlet end of said first stream and the inlet end of said second stream for conducting fluid to the inlet end of said first stream, and wherein the outlet end of said second stream communicates with the throat of said Venturi tube for conducting less highly heated fluid thereto.

7. Apparatus comprising first duct casing means having a first fluid inlet and a first fluid outlet for conducting fluid from said first fluid inlet to said first fluid outlet, Venturi tube means having a throat, means communicating between said first fluid outlet and the throat of said Venturi tube, nozzle means directed into said Venturi tube throat and spaced therefrom, second duct casing means communicating at one end with the first fluid inlet of said first duct casing means for receiving fluid therefrom, and communicating at the other end of said second duct casing with said nozzle means for discharging fluid through said nozzle means into said Venturi tube throat, first immersion heating means extending into said first duct casing means for heating the fluid therein, second immersion heating means extending into said second duct casing means for heating the fluid therein to a higher degree than the fluid in said first duct casing means, whereby a jet of highly heated fluid is discharged from said nozzle means into the throat of said Venturi tube means, and whereby ejector action is set up thereby, to draw the fluid in said second duct casing into said Venturi tube throat for intermixture with said fluid jet and for discharge with substantially increased energy from said Venturi tube outlet.

8. The construction according to claim 7, wherein each of said immersion heating means comprises a heating casing extending into said fluid streams, electrical resistance heating wires in said heating casing, lead wire means connected to said electrical heating wires and connectable to a current source for energizing the same to produce heat for said fluid streams.

9. The construction according to claim 7, characterized further in that there is an outer casing means extending around said first duct casing means and spaced therefrom at least at some areas thereof to define therebetween a second fluid heating passageway, with second fluid inlets and outlets for conducting second fluid through said second fluid heating passageway for being heated therein from heat derived from said immersion heating means.

10. The construction according to claim 7, characterized further in that there is an outer casing means extending around said first and second duct casing means and spcaed therefrom at least at some areas thereof to define therebetween a second fluid heating passageway, with second fluid inlets and outlets for conducting second fluid through said second fluid heating passageway for being heated therein from heat derived ultimately from said immersion heating means.

11. The construction according to claim 10 characterized further in that said second fluid inlets and outlets are so arranged and constructed as to provide contra-flow heating transfer to said second fluid while passing through said second fluid heating passageway.

12. The construction according to claim 1, characterized further in that said means for dividing said flow of said fluid into a first stream and at least a second stream, are provided with constrictions for constricting said fluid streams intermediate their ends.

13. A device for heating fluid comprising wall means defining a fluid passageway, first fluid immersion heating means extending into said fluid passageway and being energized to produce heat from a source to heat said fluid flowing through said passageway, second fluid heating means extending around said wall forming said fluid passageway and being energized to heat said fluid passing through said passageway, whereby said fluid stream is heated from the inside and the outside thereof.

14. A device for heating fluid comprising first immersion heating means, second immersion heating means having an annular inner wall defining a passageway into which said first immersion heating means extends, said first and second heating means being constructed and arranged to define a hollow fluid passageway therebetween for the flow of fluid to be heated, whereby said fluid flowing therethrough is heated from within and from without.

15. The construction according to claim 14, wherein said first immersion heating means comprises an elongated cylinder electrically heated from within, and wherein said second immersion heating means comprises a second electrically heated cylinder of substantially greater diameter inside than the outside diameter of said first immersion heating means, whereby said hollow fluid passageway therebetween is in the shape of an elongated annulus.

16. A heating device comprising a housing defining a combustion chamber for the production of hot gases, a metallic member extending into said combustion chamber for being heated by said hot gases, an outer portion of said metallic member extending outside said housing, a water jacket means engaging said outer portion of said metallic member and constructed and arranged to provide a passageway for fluid flow therethrough, whereby upon the heating of said inner end of said metallic member its heat is carried by conduction to its said outer portion to heat said fluid, and preheater means disposed in the path of said hot gases and constructed and arranged for conducting cool water therethrough for being heated before entering said water jacket means.

17. The construction according to claim 16, wherein said water jacket is connected with a source of fluid and connects to a useful load device, and wherein said inner end of said metallic member is provided with surface increasing means in the nature of fins and the like, for deriving heat from said heat source at high efficiency.

18. The construction according to claim 2, wherein said electrically energized immersion heaters are provided with protective means for disconnecting the energy source thereof upon elevation of the heating effect thereof beyond a predetermined level of temperature.

19. The construction according to claim 2, wherein said electrically energized immersion heaters are provided with protective means for disconnecting the energy source thereof upon increase of the output temperature of the fluid flowing out of said Venturi-tube means beyond a predetermined temperature level, or upon increase of the temperature of said immersion heaters beyond said predetermined temperature, measured at the outer surface of said immersion heaters.

References Cited in the file of this patent

UNITED STATES PATENTS

| Number | Name | Date |
|---|---|---|
| 773,927 | Cleveland | Nov. 1, 1904 |
| 954,945 | Elbrecht | Apr. 12, 1910 |
| 1,059,481 | Maslin | Apr. 22, 1913 |
| 1,200,766 | Searles | Oct. 10, 1916 |
| 1,318,237 | Sordi | Oct. 7, 1919 |
| 1,399,192 | Clough | Dec. 6, 1921 |
| 1,511,961 | Halary | Oct. 14, 1924 |
| 1,554,666 | Taylor | Sept. 22, 1925 |
| 1,596,837 | Hopkins | Aug. 17, 1926 |
| 1,707,554 | Hendry | Apr. 2, 1929 |
| 1,931,426 | Baumann | Oct. 17, 1933 |
| 2,477,473 | Anderson | July 26, 1949 |
| 2,519,920 | Miner | Aug. 22, 1950 |
| 2,537,821 | Foder | Jan. 9, 1951 |